3,195,936
SPECIAL SLEEVE AND COUPLING B-NUTS
Alfred C. Conder, Huntsville, Ala.
Filed Dec. 17, 1962, Ser. No. 245,208
1 Claim. (Cl. 285—334.5)

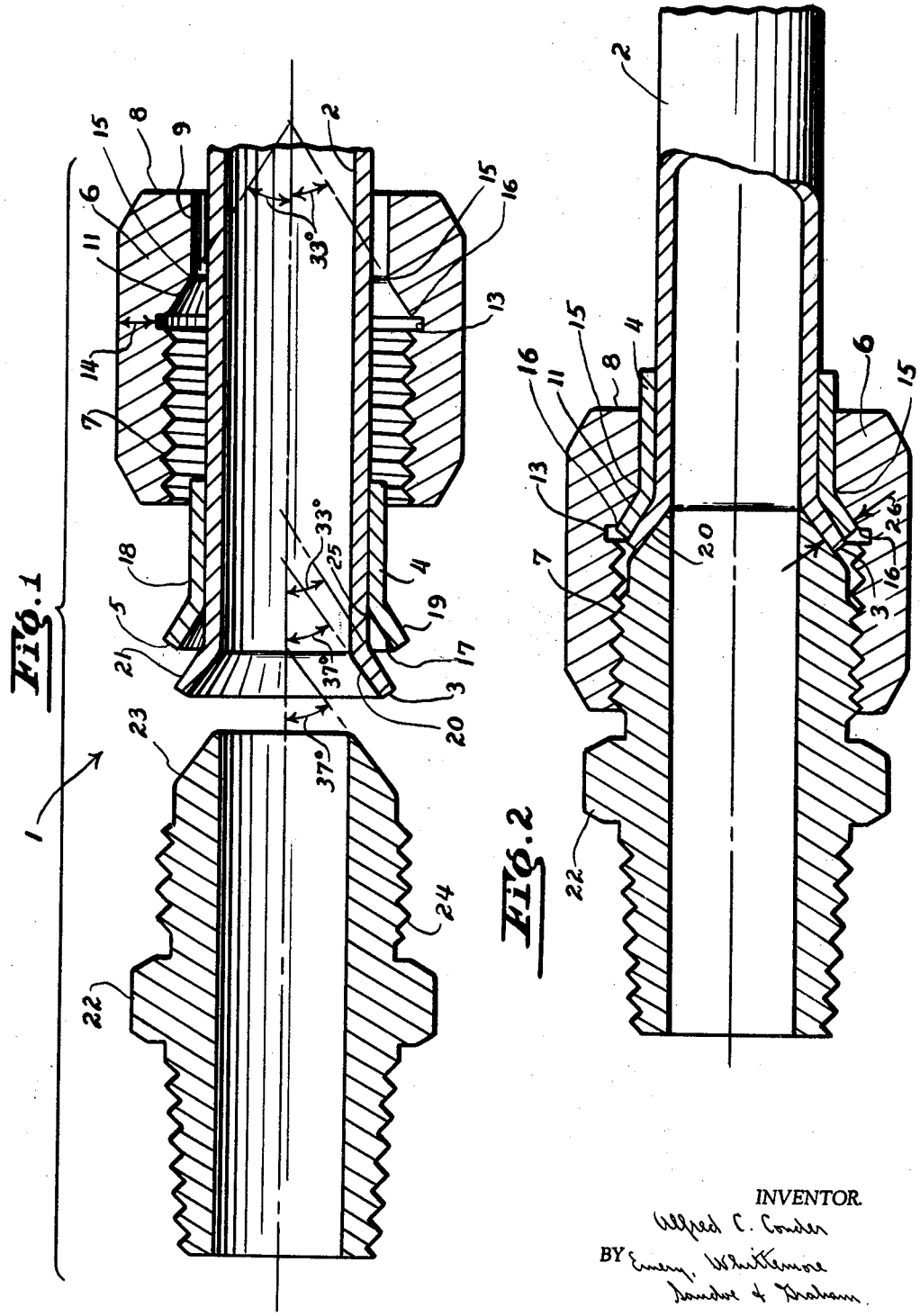

This is a continuation-in-part of application Serial No. 53,487, filed Sept. 1, 1960, now abandoned.

This invention relates to connectors for joining flared tubes and more particularly to connectors subject to high pressure when in use and high torques accompanied by deformation of the clamping member when being assembled.

Connectors which are commercially available have in practice failed to produce the desired results when used in present missile systems. Connectors for use in missile propulsion systems, for example, are subjected to wide temperature changes because of the flow of liquid oxygen at very low temperatures, the flow of fuels at higher temperatures, and the radiant heat of the propulsion chamber after ignition of the propellants. During shipment, the missile and the connectors may be subjected to severe vibrations, and this is true even to a greater extent during launching of the missile.

Presently available connectors, such as the one shown in U.S. Patent No. 2,434,975, have been tried but have proven deficient since their torque tolerances are rated in inch-pounds and they cannot withstand the high torques (approximately 125 to 350 foot-pounds) applied on the clamping member and required to effect a 100% leakproof union during assembly of a missile. Various sizes of tubing require different torque values.

It is therefore, an object of the present invention to provide a connector to overcome the above mentioned difficulties.

Another object of this invention is to provide a connector which will withstand the very high torques required in assembly and disassembly of the connector without damage to any parts of the connector.

A further object of the present invention is to provide a connector having a clamping member made of metallurgically-hardened metal and having a deformable portion therein for effecting a leakproof union of flared tubes.

The present invention contemplates the provision of a connector having a coupling member provided with annularly-bevelled ends and external threads adjacent the ends. A sleeve having a flared end is disposed around each flared tube that is to be connected. A clamping member has an internally-threaded portion, an end portion including an inwardly-directed shoulder having an inner and angularly-bevelled annular surface, and an intermediate portion is disposed between the threaded portion and the end portion. The intermediate portion preferably has a circumferential groove in its inside face.

The clamping member is arranged to fit around the sleeve and the tubing for rotative engagement of its threaded portion with the threaded portion of the coupling. In response to the rotative engagement of the threads, the intermediate portion forces the flared end of the tube and sleeve to be compressed between the bevelled surface of the shoulder of the clamping member and the annularly-bevelled end of the coupling member to effect a leakproof seal.

Other objects, features and advantages of the invention will appear or be pointed out as the description proceeds.

In the drawing, forming a part hereof, in which like reference characters indicate corresponding parts in all the views:

FIGURE 1 is an exploded view, in cross section, of the connector; and

FIGURE 2 is a view in cross section of the connector in its assembled condition.

In FIGURE 1 the numeral 1 generally indicates the connector. The tube 2 to be connected is shown as having a flared end 3. A sleeve 4 fits loosely around the tube 2 and has a flared end 5 which extends over the flared end 3 of the tube 2.

The clamping member 6 fits over both the sleeve 4 and the end portion of the tube 2. This clamping member 6 has an internally-threaded portion 7, and an end portion 8 with a bore having an inside surface 9 of cylindrical shape and of a diameter to fit over the cylindrical portion of the sleeve 4. The cylindrical inside surface 9 is of substantial length so as to give the connector a large mass to provide the necessary hoop strength for the connector. In the preferred construction, the portions of the nut or clamping member 6 having the inside surface 9 is of a length at least as great as the radial thickness of this portion of the member 6 to provide hoop strength for high torque.

Beyond the cylindrical inside surface 9, the clamping member 6 has a sloping face 11 which has the same angle to the longitudinal axis of the fitting as does the bevelled face of the sleeve 4.

There is a circumferential groove 13 in the inside surface of the clamping member 6 between the sloping face 11 and the threaded portion 7. This groove 13 may be a thread relief of substantially the same depth as the threads, but is preferably somewhat deeper.

The thickness of the clamping member 6 in the plane which passes through the groove 13 is correlated with the diameter of the clamping member and the material, of which the clamping member is made, so as to yield when the connector is assembled, as will be more fully explained.

The corner where the sloping face 11 meets the cylindrical inside surface 9 is rounded off to a radius and so is the corner where the sloping face 11 meets the side wall of the groove 13. For small-diameter connectors, it is sufficient merely to break the corners; but for larger connectors, in excess of about 3/8" tubes, a radius of about .040" is desirable at the corner 15 and a somewhat larger radius of .125" is desirable at the corner 16. These values are given merely by way of illustration and it should be understood that even with these radii, most of the axial width of the sloping face 11 is frusto-conical.

The flared end 5 of the sleeve 4 has both its inner surface 17 and its outer surface 19 parallel to one another and at an angle of approximately 33° to the axis of the tube and sleeve, this being the same angle as the outside surface of the flared end 3 of the tube. The thickness of the sleeve 4, including the flared end 5, is substantially the same as the wall thickness of the tube 2.

Present military specifications require that the flared end 3 have an inside surface 20 at an angle of 37° to the axis of the tube; and an outside surface 21 at an angle of 33° to the tube.

A coupling member 22 has a conical end face 23 which, according to military specifications, makes an angle of 37° to the axis of the coupling member. There are external threads 24 on the coupling member 22 for receiving the threads 7 of the clamping member 6. FIGURE 2 shows the correlation of the parts when the clamping member 6 is screwed over the threads 24 of the coupling member 22.

As the clamping member 6 is screwed on the coupling member 22, the sloping face 11 contacts with the face 19 of the sleeve and advances the sleeve 4 along the tube 2 until the inner face 17 of the sleeve clamps against the outside surface 21 of the flared end 3. This clamping pressure forces the inside face 20 of the tube against the conical end face 23 of the coupling member 22.

It is important that the clamping face 11 of the nut or clamping member 6 is on a slope, and that this slope is substantially the same as that of the faces 17, 19 and 21. This applies the clamping pressure in the desired direction, and the angle is such that the radial component of the clamping force does not become excessive. At angles less than about 31°, the radial component becomes so great in a highly-torqued connector, that the nut or clamping member 6 freezes to the sleeve 4 and forces the sleeve to turn on the tube 2 under high pressure which causes galling of the metal of the tube. This makes it impossible to disassemble a connector to reuse it. Angles up to approximately 41° could be used without developing excessive radial components, but as long as the military specification is for 33° angles, the sloping faces 11, 17 and 19 of this invention should be substantially 33°, and all parallel with one another.

In the preferred construction, there is a radius 25 where the inner face 17 merges with the cylindrical inside surface of the sleeve 4. A radius of .110" has been found satisfactory and this provides a relief which obtains more uniform pressure of the flared end 5 of the sleeve 4 against the flared end 3 of the tube 2.

It is essential that the sleeve 4 be continuous around the tube 2. Fittings having split sleeves or sleeves with slots have been found completely unsatisfactory for high-torqued connectors. The split or slot almost always causes scoring of the outside of the tube, and this is unacceptable for re-usable fittings.

To be assured of a completely leakproof seal, the clamping member 6 is tightened by the application of very high torque up to as much as 300 foot-pounds on a ¾" tube. This forces the clamping member 6 to highly compress the flared end 5 of the sleeve 4, and also forces the end portion of the clamping member, beyond the groove 13, to expand to some extent, there being a bending of the section in the annular area indicated by the reference character 14. This bending has the advantage of facilitating the directing of the clamping force against the flared end of the sleeve; and the clamp member 6 is made of a metallurgically hardened metal so that the bending has the additional advantage of providing some resilient or spring effect in the clamping force so that the high torque is retained over longer periods of time.

The sleeve 4 is made of a malleable material and is of substantially the same thickness as the tube 2 so that the clamping forces are exerted substantially perpendicular to the clamped surfaces 11, 17, 19, 20, 21 and 23. These clamping forces with their radial components cause the sleeve to become compressed and to swedge to some extent to effect a complete seal against leakage while still maintaining enough resiliency so that the connector can be repeatedly disassembled and re-assembled with assurance that a 100% leakproof seal will be accomplished on each subsequent assembly in spite of high pressure.

The present invention has been described with a certain degree of particularity; however, it is to be understood that various changes and modifications may be resorted to without departing from the spirit and scope of the invention as described in the appended claim.

What is claimed is:

A reusable coupling for a tube having a flared end and for withstanding high pressure fluid including (a) a coupling member having an end face for fitting into the flared end of the tube and having a surface with threads thereon,
(b) a coupling nut having threads that fit over those on the coupling member and that screw along the threads on the coupling member,
(c) a bevel clamping surface on the inside of the nut beyond the threads in the direction away from the coupling member,
(d) the clamping nut having a portion beyond the bevel clamping surface and with a cylindrical bore for passage of a cylindrical portion of the tube through the nut,
(e) the portion of the clamping nut beyond the bevel clamping surface extending for a distance at least as great as the radial thickness of the portion of the nut through which the cylindrical bore extends and said portion of the clamping nut having a radial thickness substantially as great as the radial thickness of the nut at the small end of the bevel clamping surface,
(f) a sleeve with a cylindrical portion that assembles with a sliding fit over the tube end and of an outside diameter to assemble with a sliding fit inside said cylindrical bore of the clamping nut,
(g) the sleeve having a flared frusto-conical end for contact with the outside of the flared end of the tube,
(h) the bevel surface of the nut being in position to clamp against the flared end of the sleeve and being at substantially the same angle to the axis of the tube as is the flared end of the sleeve against which the bevel surface clamps, and the angle of the flared end of the tube being the same as that of the flared surface of the tube which contacts with the flared end of the sleeve,
(i) said angle being between 31° and 41°,
(j) the bevel clamping surface of the nut, where it meets the inside surface of the cylindrical bore of the nut, being rounded off to a radius, the radius being correlated with the size of the tube to relieve localized axial displacement of the sleeve at the juncture of its flared end with the cylindrical portion of the sleeve and to obtain more uniform clamping pressure against the flared ends of the sleeve and tube with the pressure substantially perpendicular to the clamping surfaces, causing the sleeve to become compressed and swedged to effect a complete seal against leakage,
(k) and said sleeve also having a radius where the inside surface of the flared end of the sleeve merges with the inside of the cylindrical portion of the sleeve to further promote uniform clamping pressure of the flared ends of the sleeve and tube,
(l) all of the clamping surfaces of the nut, sleeve, and coupling member being circumferentially continuous to avoid scoring that would render the fitting unsuitable for reuse,
(m) and a groove between the threads and the large diameter end of the bevel clamping surface of the nut providing local yielding of the nut in diametral planes to facilitate the directing of the clamping force and to provide some spring effect to retain high torques over long periods of time.

References Cited by the Examiner

UNITED STATES PATENTS

| | | | |
|---|---|---|---|
| 1,058,542 | 4/13 | Brown | 285—334.5 |
| 1,959,314 | 5/34 | Wile | 285—334.5 |
| 2,189,566 | 2/40 | Kreidel | 285—234.5 |
| 2,424,727 | 7/47 | Wenk | 285—334.5 |
| 2,466,317 | 4/49 | Kane | 285—334.4 |
| 2,517,617 | 8/50 | Woodling | 285—334.5 |

FOREIGN PATENTS 557,266  4/23  France.

CARL W. TOMLIN, *Primary Examiner.*